United States Patent [19]
Ferriter et al.

[11] Patent Number: 5,134,560
[45] Date of Patent: Jul. 28, 1992

[54] METHOD AND SYSTEM FOR GENERATION OF MANUFACTURING PROCESS PLANS

[75] Inventors: Kate M. Ferriter, Atlanta; Stephen P. Krosner; John F. Laszcz, both of Marietta; David H. Withers, Roswell, all of Ga.

[73] Assignee: International Business Machines Corporation, Armonk, N.Y.

[21] Appl. No.: 425,786

[22] Filed: Oct. 23, 1989

[51] Int. Cl.$^5$ .............................................. G06F 15/46
[52] U.S. Cl. ....................................... 364/188; 364/468; 395/159
[58] Field of Search .................... 364/474.24, 518–521, 364/474.25, 146, 188, 189, 190, 468, 474.20, 474.21, 474.22, 474.23, 474.26; 340/723, 747; 395/155, 159

[56] References Cited

U.S. PATENT DOCUMENTS

| | | |
|---|---|---|
| 4,546,435 | 10/1985 | Herbert et al. |
| 4,656,603 | 4/1987 | Dunn . |
| 4,813,013 | 3/1989 | Dunn . |
| 4,873,643 | 10/1989 | Powell et al. ........................ 364/188 |
| 4,914,568 | 4/1990 | Kodosky et al. .................... 364/578 |

Primary Examiner—Robert W. Beausoliel
Assistant Examiner—Thomas E. Brown
Attorney, Agent, or Firm—Andrew J. Dillon

[57] ABSTRACT

A method and system are disclosed for the efficient generation of manufacturing process plans. A visual image of at least a portion of a selected product is captured or generated and displayed on a portion of the video display of a computer system. A library of iconic representations of manufacturing process steps is also displayed, each having a stored textual instruction associated therewith. By utilizing a graphical pointing device, the operator may select a location within the visual image and thereafter select the iconic representation of the manufacturing step desired. In a preferred embodiment of the present invention, the operator may selectively alter the textual instruction utilizing a known text editor. In the depicted embodiment of the present invention, the textual instructions are automatically sequentially numbered and stored for later use by a manufacturing technician during the manufacturing process. The visual image of the selected product is also altered to include reference numerals corresponding to each sequentially numbered textual instruction.

8 Claims, 5 Drawing Sheets

METHOD AND SYSTEM FOR GENERATION OF MANUFACTURING PROCESS PLANS

BACKGROUND OF THE INVENTION

1. Technical Field

The present invention relates in general to improvements in manufacturing technology and in particular to methods and systems for efficiently generating manufacturing process plans intended for use by manufacturing technicians. Still more particularly, the present invention relates to improved methods for generating consistent computer based manufacturing process plans which include corresponding annotated visual images which may be easily followed by a manufacturing technician.

2. Description of the Related Art

Manufacturing technology has long had as its primary goal the ability to consistently produce a high quality product. Over the years the efforts which have been made to achieve this goal have been directed primarily to the improvement of the documentation which is utilized by the manufacturing technician or floor operator during the manufacturing process. However, the rapidity with which the product undergoes Engineering Changes (EC) and the manufacturing process evolves often renders hard copy documentation obsolete soon after it has been distributed. The probability that the primary documentation utilized by the floor operator is either downlevel or incomplete will often result in degradation in either product quality or consistency and reduced manufacturing productivity.

As a result of the aforementioned problem, it has been a recent goal in manufacturing circles to implement the so-called "Paperless Factory." The foremost objective of a Paperless Factory system is to provide high quality information on the manufacturing plant floor. High quality in this sense is information which is current, understandable, complete and consistent. Product data currency is a key issue in those areas where manufacturing is presented with frequent Engineering Change (EC) activities from Product Design and Engineering. The level of detail and clarity of the information provided to the manufacturing plant floor is important and its value is clearly reflected in the quality of the physical product which is being manufactured.

One key issue in the implementation of a Paperless Factory system is an analysis of the intended audience for the information which is distributed to the manufacturing shop floor. The reading competency of operators on the shop floor is an important factor in the design and implementation of a Paperless Factory system.

As a result, Paperless Factory implementations make information quality and clarity more important than in traditional paper-driven implementations. Poor quality information available on line through a computer terminal may be far more damaging than poor quality information in a hard copy or paper format within the manufacturing plant setting. Operators will tend to expect that the information viewed on a computer terminal is the best and clearest available, whereas hard copy format is known to be often incomplete or unclear. As a result of incomplete or unclear hard copy information, operators in a traditional manufacturing plant often rely on informal communications with technicians, engineers, and other operators to determine work instructions in addition to the paper sources of information formally provided by the manufacturing engineer.

A goal in the modern Paperless Factory system is to systematize much of the patchwork of formal and informal communication which exists in today's manufacturing environment to improve product quality and productivity. Therefore, implementation of the Paperless Factory is more challenging than simply putting the same information which is available on paper on a computer terminal on the plant floor. For example, an ideal Paperless Factory implementation will eliminate or minimize grammar or syntax inconsistencies which are always present in process plans generated by a Manufacturing Engineer.

There are several motivations for the implementation of a Paperless Factory. The most obvious motivation is the ability to provide highly current data and configuration management to the shop floor. The information being utilized by the operator on the manufacturing shop floor in performing the manufacturing or repair operation should be the correct Engineering Change (EC) level available. In accordance with the current practice, process instructions are usually available in hard copy at the operator bench; however, the information generally available to the operator has an excellent chance of being downlevel or mismatched (i.e., a drawing which does not match the process instructions).

A well implemented Paperless Factory will eliminate or reduce the process specifications and documentation presented in paper format to the shop floor and replace those specifications with on line operator guidance which meets the shop floor requirement of high quality, current information. Another advantage of the Paperless Factory implementation is the elimination of the sheer volume of hard copy information required for the manufacturing process. It is not uncommon in certain manufacturing processes to require several hundred thousand pieces of paper for building a particular product, such as a jet aircraft. Thus, the keeping of thousands of process instructions accurate and up-to-date can result in a major bookkeeping problem. A design change may require a change to many thousands of part numbers and affect many different operations. Experience has shown that many quality problems on the shop floor can be traced to poor process documentation or out-of-date information.

Several different techniques have currently been proposed to assist the manufacturing engineer in the generation of process plans for manufacturing a product. Two such examples, "Intelligent Documentation" by CIMLINC and "Adam" by DOCUGRAPHIX both present a so-called "intelligent form" which allows the manufacturing engineer to type textual instructions into a boiler plate process form sheet. The blanks within these forms are then linked to relational data bases, directories of CAD files and ASCII text files. These textual instructions are keyed in by the manufacturing engineer and may be displayed along with a visual image of a product. An excellent example of such a system is "Shop Assist" from the GDQF family of products from International Business Machines Corporation, Inc. However, none of the aforementioned process planning techniques provides any assistance to the manufacturing engineer in the preparation of the textual instructions for the operator. As a result, there is no consistency or forethought utilized in preparing textual instructions for the floor operator. Additionally, the preparation of annotated or "marked up" drawings for implementation with such systems is a time consuming and complex problem.

Systems for the creation of drawings and schematic representations of circuits or the like are well known in the prior art. Such systems generally utilize iconic representations of circuit elements which may be randomly selected by an operator and graphically positioned within a desired circuit diagram. Excellent examples of this technology may be seen in U.S. Pat. Nos. 4,656,603 and 4,813,013. However, neither of these two patents discloses or suggests a technique for generating consistent computer based manufacturing process plans which include consistent textual instructions and which automatically annotate a product image to depict a location for the application of a manufacturing process.

As a result, it should be apparent that a need exists for an improved method and system for generating consistent computer based manufacturing process plans which include corresponding annotated visual images which may be easily followed by a manufacturing technician and which utilize consistent textual instructions.

SUMMARY OF THE INVENTION

It is therefore one object of the present invention to provide an improved method for generating manufacturing process plans.

It is another object of the present invention to provide an improved method for generating manufacturing process plans which yields consistent textual instructions throughout an entire process plan and throughout multiple process plans.

It is yet another object of the present invention to provide an improved method for generating manufacturing process plans which automatically include corresponding annotated visual images of the product being manufactured.

The foregoing objects are achieved as is now described. A method and system are disclosed for the efficient generation of manufacturing process plans which utilizes a visual image of at least a portion of a selected product which has been captured or generated and which is displayed on a video display of a computer system. A library of iconic representations of manufacturing process steps is also displayed, each iconic representation having a stored textual instruction associated therewith. By utilizing a graphical pointing device, such as a mouse, the operator may select a location within the visual image and thereafter select the iconic representation of the manufacturing step desired. In a preferred embodiment of the present invention, the operator may selectively alter the textual instruction utilizing a known text editor. In the depicted embodiment of the present invention, the textual instructions are automatically sequentially numbered and stored for later use by a manufacturing technician during production. The visual image of the selected product is also altered to include reference numerals which correspond to each sequentially numbered textual instruction.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
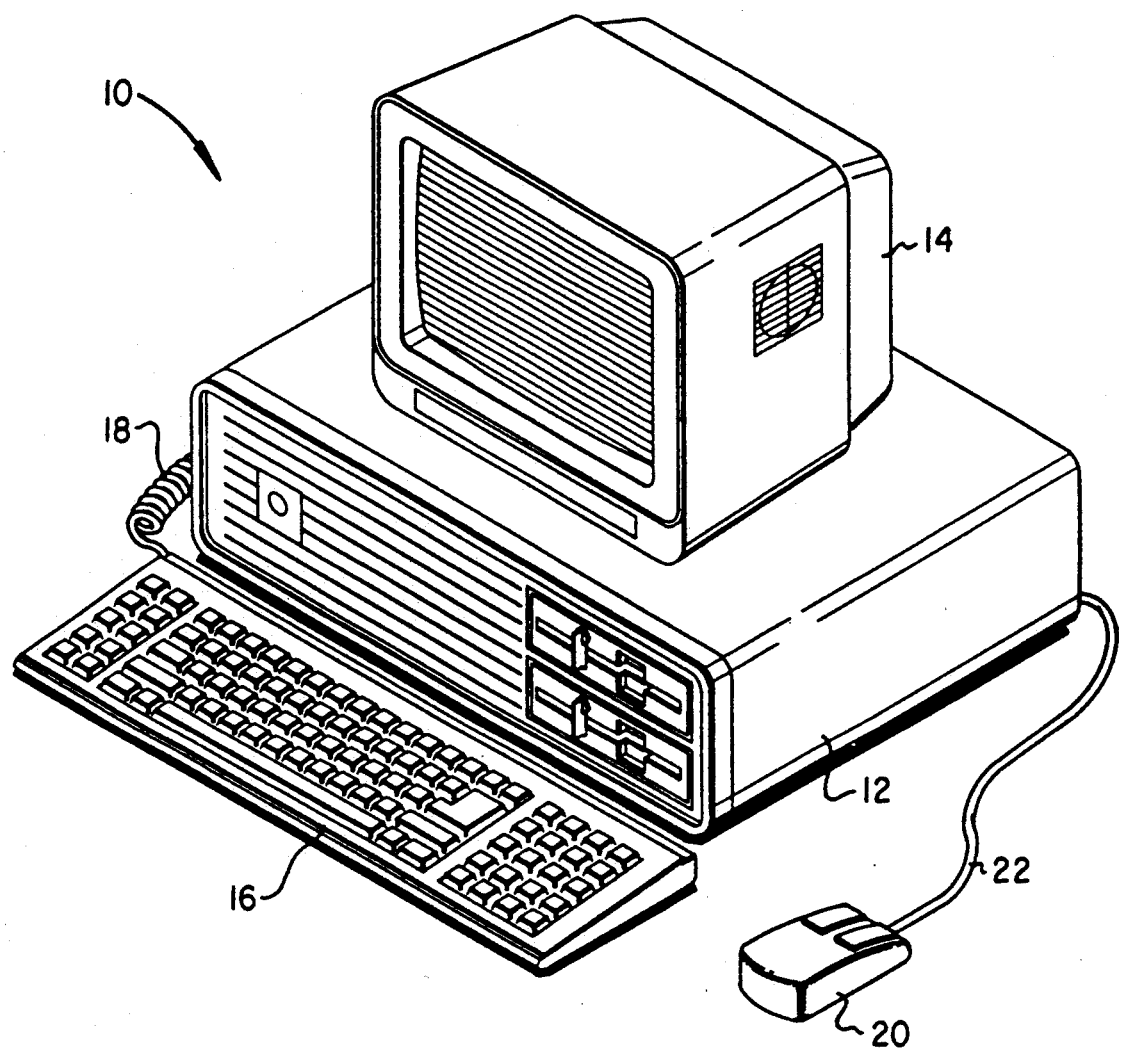
FIG. 1 is a pictorial representation of a computer system which may be utilized with the method of the present invention.

With reference now to the figures and in particular with reference to FIG. 1, there is depicted a pictorial representation of a computer system 10 which may be utilized with the method of the present invention. As may be seen, computer system 10 includes a processor 12 which preferably includes a graphics processor, memory device and a central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to processor 12 by means of cable 18.

Also coupled to processor 12 is a graphical pointing device, such as mouse 20. Mouse 20 is coupled to processor 12, in a manner well known in the art, via cable 22. While the disclosed embodiment of the present invention utilizes a mouse, those skilled in the art will appreciate that any graphical pointing device such as a light pen or touch sensitive screen may be utilized to implement the method of the present invention. Upon reference to the foregoing, those skilled in the art will appreciate that computer 10 may be implemented utilizing a so-called personal computer, such as the Model 80 PS/2 computer manufactured by International Business Machines Corporation of Armonk, N.Y.

Figure 2:
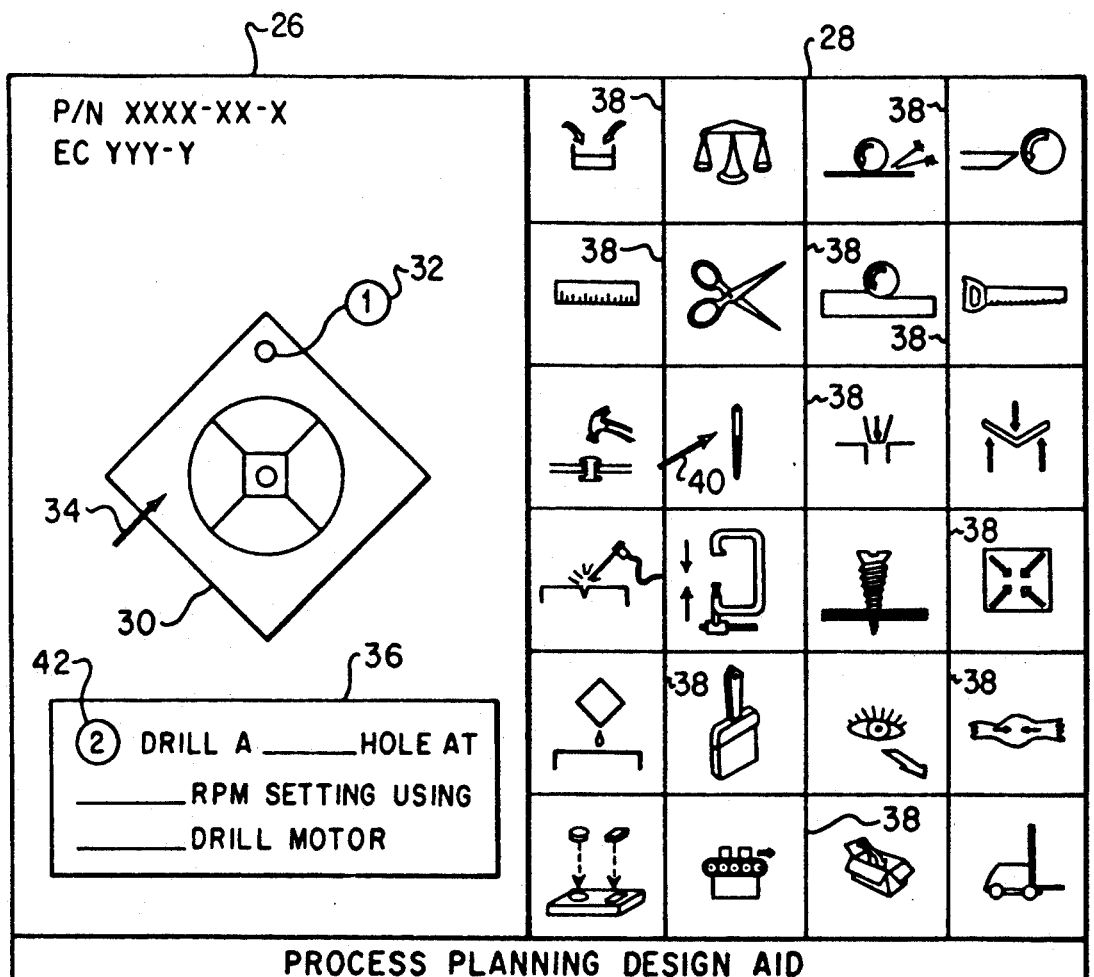
FIG. 2 is a pictorial representation of a computer display screen depicting the operation of the method of the present invention.

Referring now to FIG. 2, there is depicted a pictorial representation of a computer display screen 24 which depicts the operation of the method of the present invention. As may be seen, display screen 24 has been divided into two halves, including an image half 26 and an icon half 28.

Displayed visually within image half 26 of display screen 24 is an image 30 of a product which is to be manufactured by the process to be defined utilizing the method of the present invention. Those skilled in the computer art will appreciate that image 30 may be captured form a hard copy utilizing an image scanning technique or may be generated in vector representation utilizing well known CAD/CAM techniques. As is illustrated, image half 26 of display screen 24 also preferably discloses the part number and Engineering Change (EC) version of the product for which the manufacturing process is being defined.

In accordance with an important feature of the present invention, reference numeral 32 has been added to image 30 to indicate the location of a manufacturing process step which has previously been defined by the manufacturing engineer. In accordance with the depicted embodiment of the present invention, mouse pointer 34 may be utilized by the manufacturing engineer to select a point within image 30 for application of a subsequent manufacturing process step.

Referring again to icon half 28 of display screen 24, it may be seen that a plurality of icons 38 have been displayed. Preferably a large number of such icons may be displayed, the number and type will, of course, vary according to the manufacturing process which is being defined utilizing the method of the present invention. As is illustrated by mouse pointer 40, a particular icon may be graphically selected by the manufacturing engineer to indicate the process step which has been selected for application at the point of image 30 which has previously been designated by mouse pointer 34. Of course, those skilled in the art will appreciate that mouse pointer 34 and mouse pointer 40 are in actuality two positions of a single mouse pointer which may be rapidly relocated at any point within display screen 24 by movement of mouse 20 (see FIG. 1).

In accordance with an important aspect of the present invention, upon the selection of a particular icon 38, utilizing mouse pointer 40, a pop-up panel 36 will be displayed within image half 26 of display screen 24. Within pop-up panel 36 is a textual instruction associated with selected icon 38 which has been previously designated for utilization with that icon. As is illustrated, the textual instruction includes a fixed textual portion and several blanks which may be filled with values selected by the manufacturing engineer from among acceptable alternatives.

Additionally, in accordance with another important aspect of the present invention, the textual instruction displayed within pop-up panel 36 includes a sequential reference numeral 42 which has been automatically associated with the textual instruction by the system. Upon the completion of the optional portions of the textual instruction contained within pop-up panel 36, a reference numeral identical to reference numeral 42 will be added to image 30, at the location previously designated by mouse pointer 34. In this manner, those skilled in the art will appreciate that it is possible to consistently designate a large number of process steps within a manufacturing process plan while automatically annotating image 30 with reference numerals which correspond to each process step thus selected.

Figure 3A:
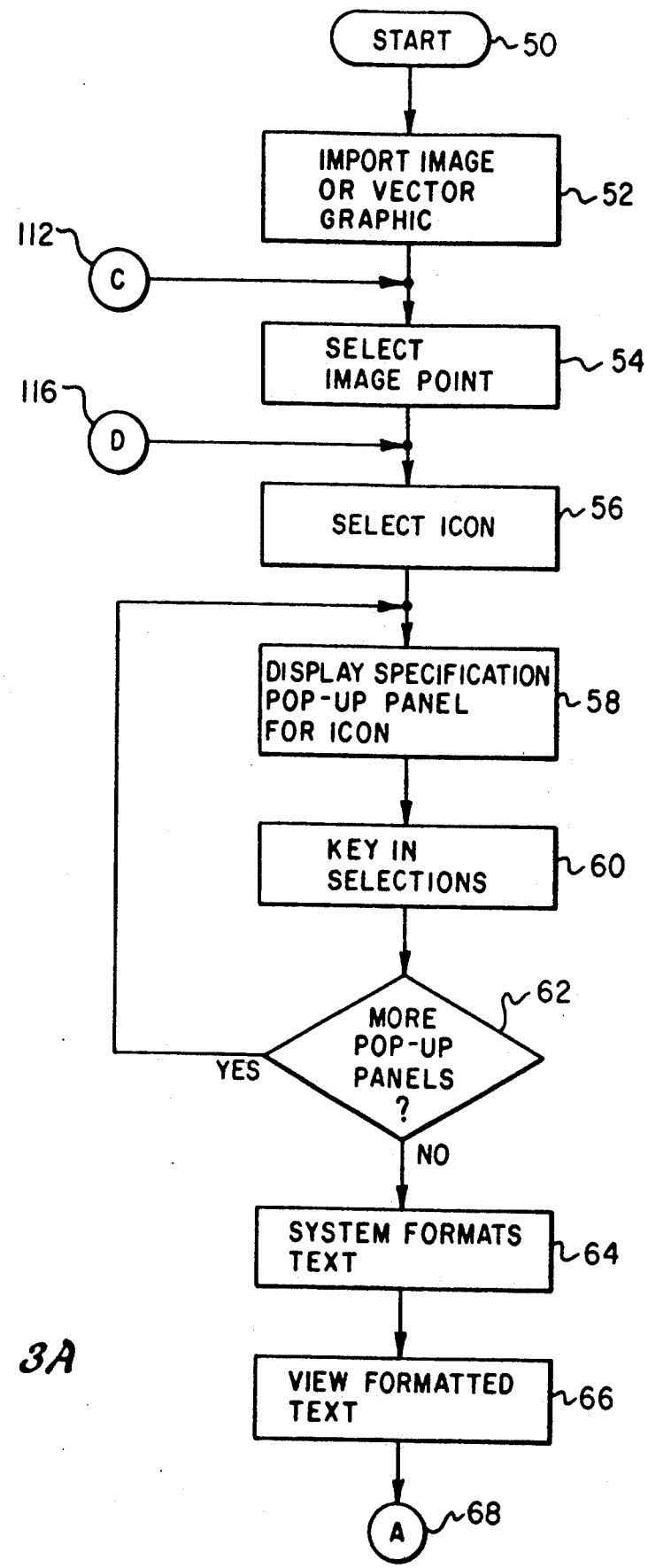
FIGS. 3A-3C form a high level flow chart depicting the method of the present invention.
Figure 3B:
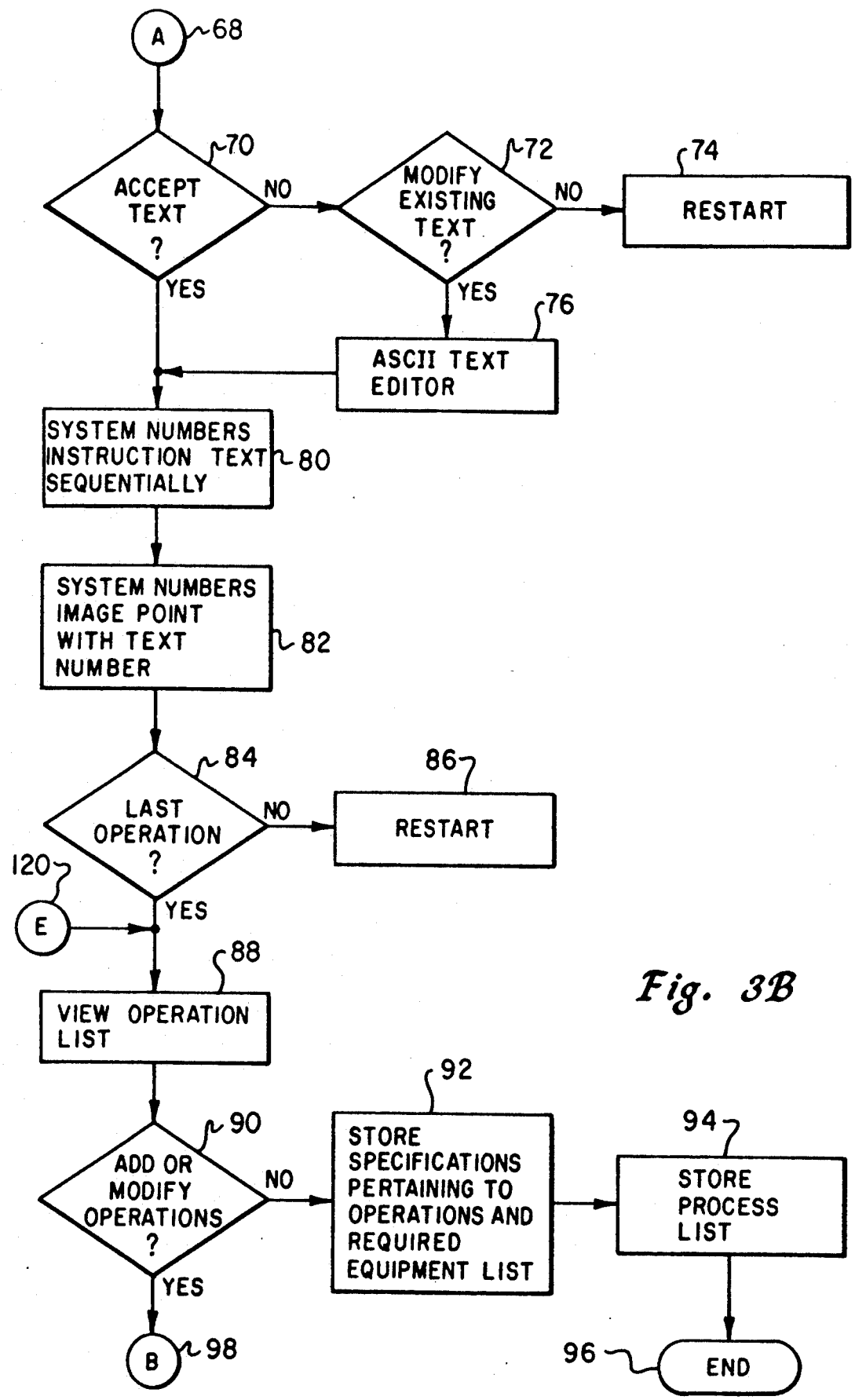
Figure 3C:
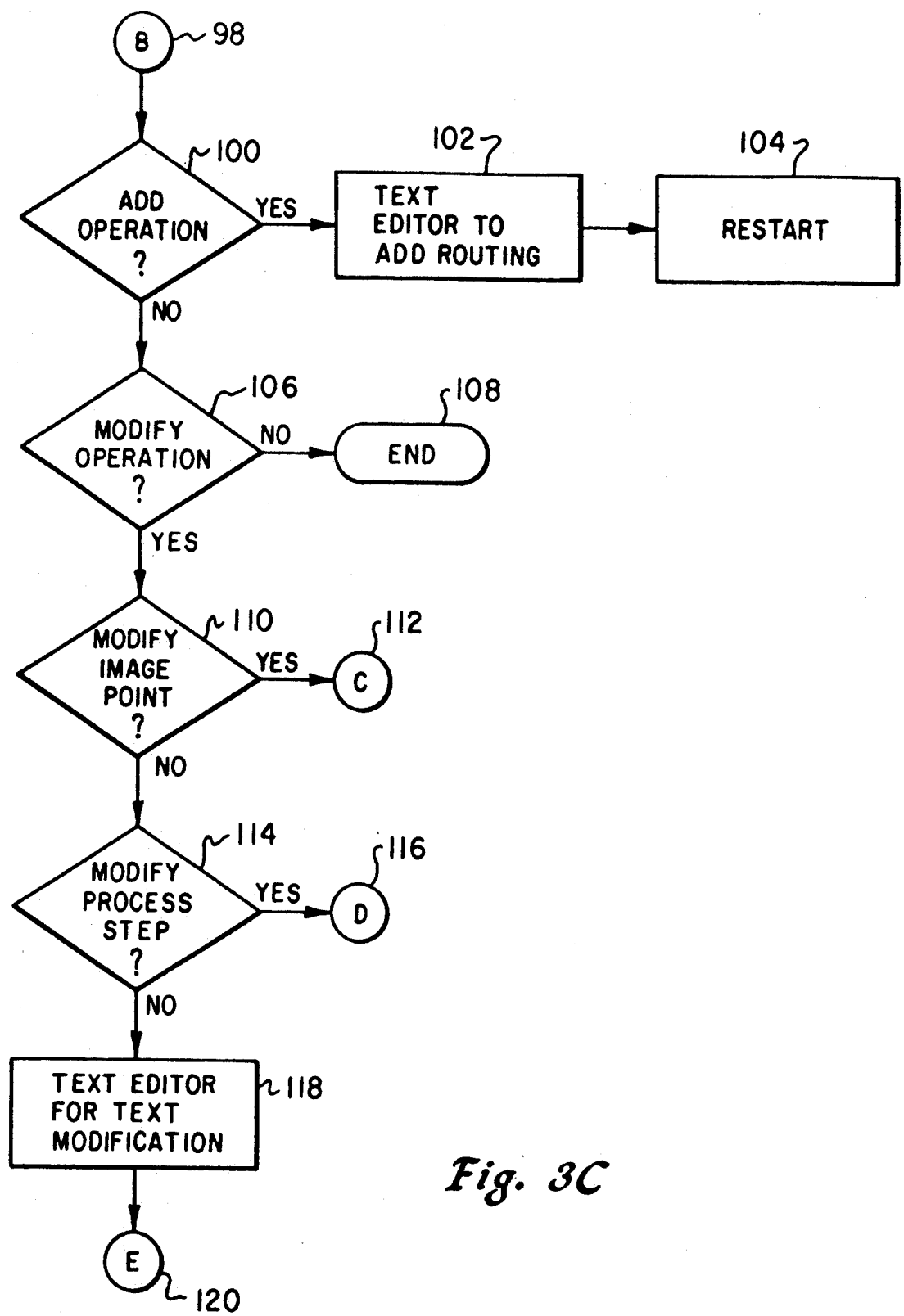

With reference now to FIGS. 3A–3C, there is depicted a high level flow chart which illustrates the method of the present invention. As may be seen, the process begins at block 50 and thereafter proceeds to block 52 which illustrates the importation of a suitable image or graphic representation of at least a portion of the product to be manufactured. Thereafter, block 54 depicts the selection of a point within the product image for application of a manufacturing process step. The coordinates of this point are preferably stored by the system until such time as a reference numeral is to be applied to this point of the image, in accordance with this previously described aspect of the method of the present invention. Next, block 56 illustrates the selection of an icon from the plurality of icons which are depicted within icon half 28 of display screen 24 (see FIG. 2).

Next, block 58 depicts the displaying of a pop-up panel for the icon selected. As discussed above, the pop-up panel for each icon includes a consistent textual instruction which may or may not include optional areas which may be selected and filled by the manufacturing engineer, in accordance with the particular process selected. Block 60 illustrates the keying in of particular selections by the manufacturing engineer and thereafter, block 62 depicts a determination of whether or not additional pop-up panels exist for the particular icon selected. If so, the process returns to block 58 and displays subsequent pop-up panels so that the manufacturing engineer may continue to modify the textual instructions thus presented, by the optional inclusion of specific data.

In the event no additional pop-up panels have previously been stored in association with the selected icon, then block 64 illustrates the formatting of the textual instruction by the system, including any textual inputs inserted by the manufacturing engineer. Finally, block 66 indicates the viewing of the formatted text by the manufacturing engineer. The process then passes via block 68 to block 70 which illustrates a determination of whether or not the manufacturing engineer has accepted the textual instruction thus generated.

In the event the manufacturing engineer elects not to accept the textual instruction thus generated, block 72 illustrates a determination of whether or not the manufacturing engineer desires to modify the existing text. If not, the process restarts, as depicted in block 74.

In the event the manufacturing engineer does desire to modify the existing text, then block 76 illustrates the utilization of a suitable text editor whereby the manufacturing engineer may modify the textual instruction to vary the preexisting or "boiler plate" portions of the text, or alter the insertions previously submitted. Thereafter, if the textual instruction has been accepted or modified, the process passes to block 80 which depicts the automatic sequential numbering of the textual instruction by the system. Next, in accordance with an important aspect of the present invention, block 82 illustrates the numbering of the image point which has previously been stored, as illustrated in block 54, with a reference numeral which corresponds to the number of the textual instruction previously generated.

Next, block 84 illustrates a determination of whether or not the operation just completed was the last operation desired by the manufacturing engineer and if not, block 86 illustrates the restarting of the program. Block 88 depicts the viewing of the total operation list in the manufacturing process after the last operation has been selected, and block 90 depicts a determination of whether or not the manufacturing engineer desires to add or modify the operations previously created. If not, block 92 depicts the storing of a required equipment list, which may be simply and easily generated from the manufacturing engineer inputs to each textual instruction, and the process list is then stored, as illustrated in block 94. The process then terminates, as depicted in block 96.

However, in the event the manufacturing engineer desires to add or modify certain of the operations within the manufacturing process thus defined, the process passes, via block 98, to block 100. Block 100 illustrates a determination of whether or not the operator desires to add an additional operation within the defined process. If so, block 102 depicts the utilization of a text editor to add additional text to the process and thereafter the program restarts, as illustrated in block 104.

In the event the manufacturing engineer does not desire to add an operation, as determined by block 100, then block 106 illustrates a determination of whether or not the manufacturing engineer desires to modify an operation. If not, the process terminates, as illustrated in block 108.

In the event the manufacturing engineer does desire to modify an operation, as determined by block 106, then block 110 is utilized to illustrate a determination of whether or not the manufacturing engineer desires to modify the image point selected, thus changing the point of application for the manufacturing process step under consideration. If so, the process returns to block 54, via block 112, and the manufacturing engineer is permitted to select a different point within the product image for application of a manufacturing process step.

In the event the manufacturing engineer does not desire to modify the image point previously selected, block 114 illustrates a determination of whether or not the engineer desires to modify a process step. If so, the process returns to block 56, via block 116, and the manufacturing engineer is permitted to select a different icon to vary the process step associated with the previously selected point within the product image.

Finally, in the event the manufacturing engineer desires to modify the text of a particular operation, block 118 illustrates the calling of a text editor to permit the manufacturing engineer to modify the textual instruction and thereafter the process returns to block 88, via block 120, to permit the manufacturing engineer to once again view the total operation list.

As those skilled in the art will appreciate upon reference to the foregoing specification, the Applicants have provided a method whereby a manufacturing process plan may be generated in a manner which highly improves the consistency and efficiency of generating such plans. By storing and utilizing a consistent textual instruction with each icon representative of a manufacturing step, the manufacturing engineer will be assisted in providing a process plan which utilizes consistent reading level, terminology, grammar and spelling throughout. Additionally, it should be appreciated that the foregoing method permits iterative actions to be saved and repeated throughout the generation of a process plan, thereby greatly enhancing the efficiency of creating such plans. It should also be noted that standard safety regulations may be easily included within each textual instruction associated with an iconic representation of a manufacturing step which requires such safety regulations, thereby assuring that safety regulations are promulgated to the manufacturing technician each time that the manufacturing process step is accomplished.

While the invention has been particularly shown and described with reference to a preferred embodiment, it will be understood by those skilled in the art that various changes in form and detail may be made therein without departing from the spirit and scope of the invention.

We claim:

1. A method for generating a manufacturing process plan for a selected product utilizing a computer system having a visual display, said method comprising the steps of:
   importing a visual image of at least a portion of said selected product;
   creating a library of icons representative of various steps within said manufacturing process;
   displaying said visual image of at least a portion of said selected product and said library of icons simultaneously within said visual display of said computer system;
   automatically generating a textual instruction describing a particular step within said manufacturing process in response to each selection of a particular icon;
   altering said visual image of at least a portion of said selected product at a graphically designated point within said visual image to depict a physical location for each particular step within said manufacturing process; and
   sequentially storing each automatically generated textual instruction and each altered visual image for each particular step within said manufacturing process wherein a manufacturing process plan is generated.

2. The method for generating and manufacturing a process plan for a selected product according to claim 1 wherein said step of automatically generating a textual instruction describing a particular step within said manufacturing process in response to each selection of a particular icon includes the step of creating a numeric designation for each step thus selected.

3. The method for generating and manufacturing a process plan for a selected product according to claim 2 wherein said step of altering said visual image of at least a portion of said selected product at a graphically designated point within said visual image to depict a physical location for each particular step within said manufacturing process includes the creation of a visual image of said numeric designation.

4. The method for generating and manufacturing a process plan for a selected product according to claim 1 wherein said step of automatically generating a textual instruction describing a particular step within said manufacturing process in response to each selection of a particular icon includes the step of permitting an operator of said computer system to alter said textual instruction.

5. A system for generating a manufacturing process plan for a selected product, said system comprising:
   a computer system having a visual display device;
   a graphical pointing device coupled to said computer system;
   means for creating a plurality of iconic representations of various manufacturing steps;
   means for generating a visual image within said visual display device of at least a portion of said selected product and said plurality of iconic representations;
   means for displaying a selected textual instruction describing a particular step within said manufacturing process in response to each selection of a particular iconic representation;
   means for altering said visual image of at least a portion of said selected product at a location designated by said graphical pointing device wherein a location for a particular step within said manufacturing process is indicated for each selection of a particular iconic representation; and
   means for sequentially storing each displayed selected textual instruction and each altered visual image for each particular step within said manufacturing process wherein a manufacturing process plan is generated.

6. The system for generating a manufacturing process plan for a selected product according to claim 5, wherein said graphical pointing device comprises a mouse pointer.

7. The system for generating a manufacturing process plan for a selected product according to claim 5, further including means for permitting an operator of said system to alter said displayed selected textual instruction prior to storage thereof.

8. The system for generating a manufacturing process plan for a selected product according to claim 5, further including means for associating a sequential numeric value with each sequentially stored selected textual instruction and each altered visual image for each particular step within said manufacturing process.

* * * * *